US011250241B2

(12) United States Patent
Yan et al.

(10) Patent No.: US 11,250,241 B2
(45) Date of Patent: Feb. 15, 2022

(54) FACE IMAGE PROCESSING METHODS AND APPARATUSES, AND ELECTRONIC DEVICES

(71) Applicant: SHENZHEN SENSETIME TECHNOLOGY CO., LTD., Shenzhen (CN)

(72) Inventors: Qiong Yan, Shenzhen (CN); Zhanpeng Zhang, Shenzhen (CN); Tianhan Wei, Shenzhen (CN); Xu Bao, Shenzhen (CN); Guijie Wang, Shenzhen (CN); Jianbo Liu, Shenzhen (CN); Canbin Wang, Shenzhen (CN); Ligen Dai, Shenzhen (CN); Wenhui Wu, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 110 days.

(21) Appl. No.: 16/587,276

(22) Filed: Sep. 30, 2019

(65) Prior Publication Data
US 2020/0042769 A1 Feb. 6, 2020

Related U.S. Application Data

(63) Continuation of application No. PCT/CN2018/082181, filed on Apr. 8, 2018.

(30) Foreign Application Priority Data

Apr. 14, 2017 (CN) .......................... 201710244395.3

(51) Int. Cl.
G06K 9/00 (2006.01)
G06T 7/70 (2017.01)
(Continued)

(52) U.S. Cl.
CPC ..... *G06K 9/00228* (2013.01); *G06K 9/00268* (2013.01); *G06K 9/6256* (2013.01);
(Continued)

(58) Field of Classification Search
CPC ........... G06K 9/00228; G06K 9/00268; G06K 9/6256; G06K 9/6262; G06K 2009/00322;
(Continued)

(56) References Cited

U.S. PATENT DOCUMENTS 6,088,040 A * 7/2000 Oda ........................ G06T 13/80
345/441
8,295,557 B2 10/2012 Wang
(Continued)

FOREIGN PATENT DOCUMENTS

CN 101667248 A 3/2010
CN 103413270 A 11/2013
(Continued)

OTHER PUBLICATIONS

Smith "Exemplar Based Face Parsing", IEEE 2013 (Year: 2013).*
(Continued)

Primary Examiner — Mark Roz
(74) Attorney, Agent, or Firm — Syncoda LLC; Feng Ma

(57) ABSTRACT

A face image processing method includes: performing face detection on an image to be processed, and obtaining at least one face region image included in the image to be processed and face attribute information in the at least one face region image; and for the at least one face region image, processing an image corresponding to a first region and/or an image corresponding to a second region in the face region image at least according to the face attribute information in the face region image, wherein the first region is a skin region, and the second region includes at least a non-skin region.

19 Claims, 8 Drawing Sheets

(51) Int. Cl.
  *G06K 9/62*   (2006.01)
  *G06T 3/40*   (2006.01)
  *G06T 5/00*   (2006.01)
  *G06T 7/20*   (2017.01)

(52) U.S. Cl.
  CPC .............. *G06K 9/6262* (2013.01); *G06T 3/40* (2013.01); *G06T 5/002* (2013.01); *G06T 7/20* (2013.01); *G06T 7/70* (2017.01); *G06K 2009/00322* (2013.01); *G06T 2207/20081* (2013.01); *G06T 2207/20084* (2013.01); *G06T 2207/30201* (2013.01)

(58) Field of Classification Search
  CPC .. G06T 7/70; G06T 3/40; G06T 5/002; G06T 7/20; G06T 2207/20081; G06T 2207/20084; G06T 2207/30201
  See application file for complete search history.

(56) References Cited

U.S. PATENT DOCUMENTS

| | | | |
|---|---|---|---|
| 8,379,958 | B2 | 2/2013 | Kaku |
| 9,864,901 | B2 | 1/2018 | Chang |
| 2010/0054550 | A1 | 3/2010 | Okada |
| 2017/0076142 | A1 | 3/2017 | Chang |
| 2017/0262970 | A1* | 9/2017 | Chen ................. G06K 9/00302 |
| 2018/0204051 | A1 | 7/2018 | Li et al. |

FOREIGN PATENT DOCUMENTS

| | | |
|---|---|---|
| CN | 103544478 A | 1/2014 |
| CN | 103632165 A | 3/2014 |
| CN | 103824049 A | 5/2014 |
| CN | 104573614 A | 4/2015 |
| CN | 104680121 A | 6/2015 |
| CN | 104715224 A | 6/2015 |
| CN | 104952036 A | 9/2015 |
| CN | 104992167 A | 10/2015 |
| CN | 104992402 A | 10/2015 |
| CN | 105069007 A | 11/2015 |
| CN | 105404877 A | 3/2016 |
| CN | 105426870 A | 3/2016 |
| CN | 105447823 A | 3/2016 |
| CN | 105654420 A | 6/2016 |
| CN | 105657249 A | 6/2016 |
| CN | 105787878 A | 7/2016 |
| CN | 105869159 A | 8/2016 |
| WO | 2015078007 A1 | 6/2015 |
| WO | 2015127394 A1 | 8/2015 |

OTHER PUBLICATIONS

Hammal (Parametric models for facial features segmentation, Signal Processing 2006) (Year: 2006).*
International Search Report in the international application No. PCT/CN2018/082180, dated Jul. 9, 2018.
English translation of the Written Opinion of the International Search Authority in the international application No. PCT/CN2018/082180, dated Jul. 9, 2018.
First Office Action of the Chinese application No. 201710247289.0, dated Apr. 26, 2019.
Second Office Action of the Chinese application No. 201710247289.0, dated Nov. 5, 2019.
Notice of Allowance of the Chinese application No. 201710247289.0, dated Apr. 13, 2020.
Yamashita, Takayoshi, et al. "Cost-alleviative learning for deep convolutional neural network-based facial part labeling." IPSJ Transactions on Computer Vision and Applications vol. 7 (Jul. 2015): 99-103.
Shorten, Connor, and Taghi M. Khoshgoftaar. "A survey on image data augmentation for deep learning." Journal of Big Data 6.1 (2019): 60. https://doi.org/10.1186/s40537-019-0197-0.
Smilth, Brandon M., et al. "Exemplar-based face parsing." Proceedings of the IEEE Conference on Computer Vision and Pattern Recognition. 2013.
Non-Final Office Action of the U.S. Appl. No. 16/600,457, dated Jan. 4, 2021.
Masatoshi Kimura et al. "Facial point detection based on a convolutional neural network with optimal mini_batch procedure"; 2015 IEEE International Conference on Image Processing (ICIP), Sep. 30, 2015 (Sep. 30, 2015), pp. 2860-2864.
Hani Altwaijry et al. "Learning to Detect and Match Keypoints with Deep Architectures"; British Machine Vision conference, Jan. 31, 2016 (Jan. 31, 2016), pp. 49.1-49.12.
Hou Alin et al. "Garment image retrieval based on multi features"; Modern Electronic Technology, Mar. 15, 2010 (Mar. 15, 2010), pp. 171-175.
International Search Report in the international application No. PCT/CN2018/082181, dated Jun. 7, 2018.
English translation of the Written Opinion of the International Search Authority in the international application No. PCT/CN2018/082181, dated Jun. 7, 2018.
First Office Action of the Chinese application No. 201710244395.3, dated Dec. 19, 2019.
Fred L. Bookstein. "Principal Warps:Thin-Plate Splines and the Decomposition of Deformations", mailed on Jun. 6, 1989.
Second Written Opinion of Singaporean Application No. 11201909141T, dated May 12, 2021.
Lv JJ, Shao XH, Huang JS, Zhou XD, Zhou X. Data augmentation for face recognition Neurocomputing. Mar. 22, 2017:230: 184-96.
Final Office Action of U.S. Appl. No. 16/600,457, dated May 17, 2021.
First Written Opinion of Singaporean Application No. 11201909141T, dated Jun. 11, 2020.

* cited by examiner

FACE IMAGE PROCESSING METHODS AND APPARATUSES, AND ELECTRONIC DEVICES

CROSS-REFERENCE TO RELATED APPLICATIONS

The present disclosure is a U.S. continuation application of International Application No. PCT/CN2018/082181, filed on Apr. 8, 2018, which claims benefit of Chinese Patent Application No. 201710244395.3, filed to the Chinese Patent Office on Apr. 14, 2017. The disclosures of these applications are incorporated herein by reference in their entirety.

BACKGROUND

In recent years, with the popularization and development of artificial intelligence technologies, the use of electronic devices such as computers to beautify faces is applied to more and more scenarios.

SUMMARY

Embodiments of the present disclosure relate to the field of computer vision technologies, and in particular, to face image processing methods and apparatuses, and electronic devices.

Embodiments of the present disclosure provide face image processing solutions.

According to a first aspect of the embodiments of the present disclosure, a face image processing method is provided, including: performing face detection on an image to be processed, and obtaining at least one face region image included in the image to be processed and face attribute information in the at least one face region image; and for the at least one face region image, processing, at least according to the face attribute information in the face region image, at least one of, an image corresponding to a first region in the face region image or an image corresponding to a second region in the face region image, where the first region is a skin region, and the second region includes at least a non-skin region.

According to a second aspect of the embodiments of the present disclosure, a face image processing apparatus is further provided, including: an obtaining module, configured to perform face detection on an image to be processed, and obtain at least one face region image included in the image to be processed and face attribute information in the at least one face region image; and a processing module, configured to process at least one of an image corresponding to a first region in the face region image or an image corresponding to a second region in the face region image at least according to the face attribute information in the face region image for the at least one face region image, where the first region is a skin region, and the second region includes at least a non-skin region.

According to a third aspect of the embodiments of the present disclosure, an electronic device is further provided, including a processor, a memory, a communication element, and a communication bus, where the processor, the memory, and the communication element are in communication with each other by means of the communication bus, and the memory is configured to store at least an executable instruction which enables the processor to execute operations corresponding to the face image processing method according to any item of the first aspect.

According to a fourth aspect of the embodiments of the present disclosure, a computer readable storage medium is further provided, having a computer program stored thereon, where the computer program includes a computer instruction, and when the computer instruction runs in an electronic device, a processor in the electronic device executes operations corresponding to the face image processing method according to any item of the first aspect.

According to a fifth aspect of the embodiments of the present disclosure, a computer program is provided, including a computer instruction, where when the computer instruction runs in a processor of a device, the processor executes operations corresponding to the face image processing method according to any item of the first aspect.

According to a sixth aspect of the embodiments of the present disclosure, an electronic device is provided, including a processor and a memory for storing instructions executable by the processor, where execution of the instructions by the processor causes the processor to perform: performing face detection on an image to be processed, and obtaining at least one face region image comprised in the image to be processed and face attribute information in the at least one face region image; and for the at least one face region image, processing, at least according to the face attribute information in the face region image, at least one of an image corresponding to a first region in the face region image or an image corresponding to a second region in the face region image, wherein the first region is a skin region, and the second region comprises at least a non-skin region.

According to a seventh aspect of the embodiments of the present disclosure, a non-transitory computer readable storage medium is provided, configuring to store computer-readable instructions, where execution of the instructions by the processor causes the processor to perform: performing face detection on an image to be processed, and obtaining at least one face region image comprised in the image to be processed and face attribute information in the at least one face region image; and for the at least one face region image, processing, at least according to the face attribute information in the face region image, at least one of an image corresponding to a first region in the face region image or an image corresponding to a second region in the face region image, wherein the first region is a skin region, and the second region comprises at least a non-skin region.

BRIEF DESCRIPTION OF DRAWINGS

The accompanying drawings constituting a part of the specification describe the embodiments of the present disclosure and are intended to explain the principles of the present disclosure together with the descriptions. According to the following detailed descriptions, the present disclosure can be understood more clearly with reference to the accompanying drawings.

DETAILED DESCRIPTION

Figure 1:
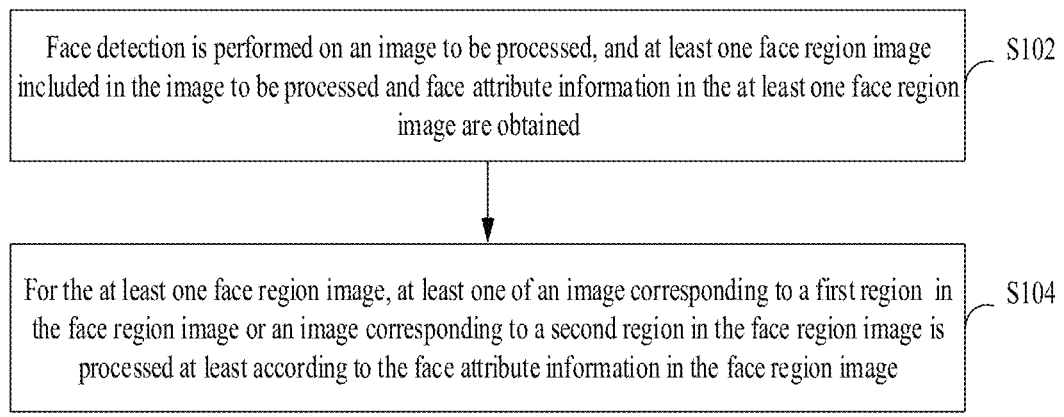
FIG. 1 is a flowchart of operations of a face image processing method according to embodiments of the present disclosure.

The following further describes in detail specific implementations of embodiments of the present disclosure by combining the accompanying drawing (the same reference numerals in several accompanying drawings represent the same elements) and embodiments. The following embodiments are intended to describe the present disclosure, rather than limiting the scope of the present disclosure.

Persons skilled in the art may understand that the terms such as "first" and "second" in the embodiments of the present disclosure are only used to distinguish different operations, devices or modules, etc., and do not represent any specific technical meaning or an inevitable logical sequence therebetween.

Referring to FIG. 1, illustrated is a flowchart of operations of a face image processing method according to embodiments of the present disclosure, including the following operations.

At block S102, face detection is performed on an image to be processed, and at least one face region image included in the image to be processed and face attribute information in the at least one face region image are obtained.

The image to be processed may include one or more (two or more) face images. In this operation, the face images included in the image to be processed are detected to obtain a corresponding face region image. Furthermore, face attribute information corresponding to at least one face region image (such as each face region image) is obtained. The face attribute information can represent the attributes of the face, such as gender, age, race, and facial attachment such as glasses. By means of the face attribute information, explicit attribute differentiation can be made between different faces.

In the embodiments of the present disclosure, the specific implementation of this operation can implement face attribute detection by persons skilled in the art according to actual needs in any appropriate mode, and corresponding face attribute information is obtained, for example, in a neural network learning mode, etc. The specific implementation of this operation is not limited in the embodiments of the present disclosure.

At block S104, for the at least one face region image, an image corresponding to a first region and/or an image corresponding to a second region in the face region image is processed at least according to the face attribute information in the face region image.

Different face attribute information corresponds to different image processing modes. Moreover, the face region image contains an image corresponding to the corresponding first region and/or an image corresponding to the second region. The first region is a skin region, and the second region includes at least a non-skin region, such as eyebrows, eyes, and the mouth, and in some cases, may also include nasal ditch, and a region under the eyes, etc.

During the intelligent face image processing, the first region and/or the second region in the face region image are distinguished according to the face attribute information, which is beneficial to improving the intelligent processing effect and avoiding the intelligent processing distortion.

According to the technical solutions provided by the embodiments, at least one face region image in the image to be processed and face attribute information in the at least one face region image are obtained, where the face attribute information can indicate faces with different attributes, e.g., a male face, a female face, and face of different ages, etc., and then, for at least one face region image, image processing solutions matching the face attribute information, such as a beautification solution, are used for different processing. During specific processing, the first region and the second region in the face region image are distinguished, and image processing is performed only on the first region, or only on the second region, or on both the first region and the second region. By means of the solutions provided by the embodiments, on the one hand, the beautification requirements of the faces of different attributes are different, and the solutions of the embodiments are used for performing different intelligent facial processing on the faces of different attributes, which is beneficial to reflecting the differences between different people and meeting different requirements of different people. On the other hand, for non-skin regions in the face, such as eyebrows, eyes, hair, and beards, the same intelligent facial processing is performed on the non-skin region, which causes distortion of the intelligent facial processing, resulting in unnatural or fake facial processing effect, and in turn reducing the intelligent facial processing effect. Therefore, distinguishing the first region and the second region in the face region image is beneficial to improving the intelligent facial processing effect. In view of the above, the solutions of the embodiments are beneficial to satisfying the user's differentiated intelligent facial processing requirements, and improving the intelligent facial processing effect. In addition, the solutions of the embodiments of the present disclosure can perform not only single image processing but also continuous processing of batch images.

The face image processing method of the embodiments may be executed by any appropriate device having image or data processing capability, including but not limited to: a camera, a terminal, a mobile terminal, a Personal Computer (PC), a server, an on-board device, an entertainment device, and an advertising device, etc.

Figure 2:
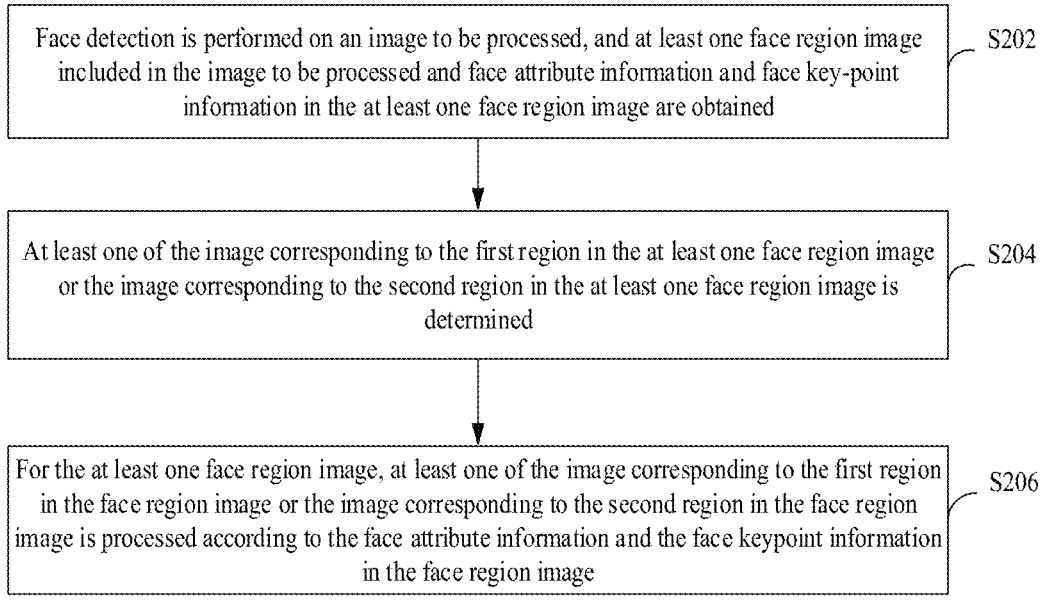
FIG. 2 is a flowchart of operations of another face image processing method according to embodiments of the present disclosure.

Referring to FIG. 2, illustrated is a flowchart of operations of a face image processing method according to embodiments of the present disclosure.

The face image processing method in the embodiments includes the following operations.

At block S202, face detection is performed on an image to be processed, and at least one face region image included in the image to be processed and face attribute information and face key-point information in the at least one face region image are obtained.

In this operation, face key-point detection and face attribute detection are performed on the image to be processed, to obtain corresponding face key-point information and face attribute information.

The face key-points represent the feature points of the face. The shape and position of the face contour, and the shape and position of the facial features and the hair, etc. may be basically determined by means of the face key-points. The face attribute information can represent the attributes of the face, such as gender, age, race, and facial attachment such as glasses. By means of the face key-point information and the face attribute information, different faces can be explicitly distinguished.

This operation is implemented by persons skilled in the art according to actual situations in any appropriate mode, which is not limited in the embodiments of the present disclosure.

An implementation of performing face detection on an image to be processed performs face detection on the image to be processed by means of a pre-trained neural network. The training of the neural network includes the following operations.

At a training operation 1, an original sample image is obtained.

The original sample image includes face key-point annotation information, that is, face key-point annotation is performed on the original sample image in advance, to perform face key-point detection training on a neural network such as a convolutional neural network.

At a training operation 2, scrambling processing is performed on the original sample image, to obtain the scrambled sample image and image information processed by information preserving scrambling processing.

In the embodiments, scrambling processing is performed on each original sample image to generate a new image, i.e., the scrambled sample image. Both the original sample image and the scrambled sample image are input into the convolutional neural network for convolutional neural network training. Meanwhile, the image information processed by the information preserving scrambling processing is recorded, including information on a difference between the original image information and the scrambled image information.

In the embodiments of the present disclosure, the scrambling processing includes information preserving scrambling processing and information non-preserving scrambling processing.

The information preserving scrambling processing refers to the scrambling processing performed on the original sample image, and the result of the scrambling processing has an impact on the output of subsequent neural network, such as the prediction and positioning of the face key-points. For example, a local translation operation such as face translation is performed on the original sample image. The translation causes the coordinates of the face key-points to change. In the training process of the neural network, a prediction result of the face key-point in the original sample image output by the neural network is different from a prediction result of the face key-point in the translated sample image, that is, the translation operation has an impact on the prediction of the face key-point.

The information non-preserving scrambling processing refers to the scrambling processing performed on the original sample image, and the result of the scrambling processing does not affect the output of the subsequent neural network. For example, noise processing is performed on the original sample image. However, the processing does not cause the coordinates of the face key-points to change. In the training process of the neural network, a prediction result of the face key-point in the original sample image output by the neural network is different from a prediction result of the face key-point in the sample image subjected to noise processing, that is, the noise processing does not affect the prediction of the face key-point.

The scrambling processing performed on the original sample image includes at least information preserving scrambling processing. Alternatively, however, information preserving scrambling processing and information non-preserving scrambling processing may also be performed simultaneously. In the embodiments, the scrambling processing performed on the original sample image adopts a mode including both information preserving scrambling processing and information non-preserving scrambling processing. In the anti-jitter convolutional neural network training, only the information preserving scrambling processing is used for scrambling the original sample image, and then training the convolutional neural network, which is beneficial to making the training more targeted. Moreover, both the information preserving scrambling processing and the information non-preserving scrambling processing are used for scrambling the original sample image, and then training the convolutional neural network, which is beneficial to training the anti-jitter performance of the convolutional neural network, and enabling the convolutional neural network to identify and further detect different images, thereby improving the detection performance of the convolutional neural network. However, since the information non-preserving scrambling processing does not affect the output of the convolutional neural network to the face key-points, it is only necessary to record the image information processed by the information preserving scrambling processing.

The information preserving scrambling processing and the information non-preserving scrambling processing on the original sample image may be performed by any appropriate mode by persons skilled in the art, for example, performing information non-preserving scrambling processing by means of contrast adjustment or a Gaussian noise function, and performing information preserving scrambling processing by means of at least one of affine transformation processing, translation processing, scaling processing, or rotation processing, etc. However, it is not limited thereto, and other scrambling processing is also applicable.

The image information processed by the information preserving scrambling processing includes information on the difference between the original image information and the scrambled image information. For example, the coordinate of a certain face key-point in the original sample image is (X1, Y1), the coordinate of the face key-point in the scrambled sample image is (X2, Y2), and the difference between the coordinates is the distance between the coordinates. In view of the above, the difference caused by the scrambling is obtained by means of the image information.

In addition, in the embodiments of the present disclosure, unless otherwise specified, the face key-points adopt conventional face key-point definition, and are applicable to the detection of any number of face key-points, including but not limited to application scenarios of 21 face key-points, 68 face key-points, and 106 face key-points, etc.

At a training operation 3, the original sample image and the scrambled sample image are detected based on the neural network, to obtain first prediction information for a face key-point in the original sample image and second prediction information for a face key-point in the scrambled sample image.

The original sample image and the scrambled sample image are input into the convolutional neural network for detection training, and corresponding prediction information is obtained, respectively. A convolutional layer part in the convolutional neural network adopts a conventional convolution layer part, including but not limited to a convolutional layer, a nonlinear response unit (a nonlinear response unit includes but is not limited to a ReLU layer), a feature extraction layer, and a computing layer, etc. The processing of the original sample image and the scrambled sample image is performed with reference to the processing of the relevant convolutional neural network, and details are not described herein again. The corresponding prediction information is obtained after the detection by the convolutional neural network. For the original sample image, the prediction information is a detection result of the face key-point in the original sample image. For the scrambled sample image, the prediction information is a detection result of the face key-point in the scrambled sample image (certain prediction information is understood as an output result of the convolutional neural network in a certain training process).

At a training operation 4, a first difference between the first prediction information and the face key-point annotation information in the original sample image, a second difference between the first prediction information and the second prediction information, and a third difference between the second difference and the image information processed by the information preserving scrambling processing are determined.

In the embodiments, the first difference between the first prediction information and the face key-point annotation information in the original sample image is determined by using a first loss function, and the second difference between the first prediction information and the second prediction information is determined by using a second loss function. The first loss function is used for measuring the accuracy of the face key-point prediction result in the original sample image, and the second loss function is used for measuring a difference between the face key-point prediction result in the original sample image and the face key-point prediction result in the scrambled sample image. The first loss function is a loss function in the conventional convolutional neural network, such as a EuclideanLoss function and a SmoothL1Loss function, and the loss value obtained by the first loss function is a first loss value. The second loss function is a function that measures the difference between two detection results as appropriate. In an optional solution, an appropriate distance calculation function (in order to distinguish from subsequent distance calculation functions, the distance calculation function is recorded as a first distance calculation function) is used as the second loss function. In this case, the first prediction information and the second prediction information are obtained, a distance between the first prediction information and the second prediction information is calculated by using the first distance calculation function, and the distance is determined as a second loss value, the second loss value is the second difference. The first distance calculation function is any appropriate function, such as a Euclidean distance calculation function and a Marsh distance calculation function. It should be noted that the obtaining the first difference and the obtaining the second difference may be performed in any order, for example, may be performed in parallel.

Further, a distance between the second difference and the image information processed by the information preserving scrambling processing is obtained by means of a second distance calculation function, where the distance is the third difference. The second distance calculation function is any appropriate function, such as a Euclidean distance calculation function and a Marsh distance calculation function.

By determining the difference between the first prediction information and the face key-point annotation information in the original sample image, the current training result is evaluated as the basis for subsequent training of the neural network. Moreover, by determining the difference between the first prediction information and the second prediction information, the prediction of the face feature points of the same face in two adjacent frames can be evaluated, and the neural network prediction information of two image frames with only slight differences is constrained, which is beneficial to the case that the neural network is finally applied to the video frame processing, the difference of the prediction information between the two image frames becomes smaller. The third difference reflects the consistency between the difference between the original sample image and the scrambled sample image after the processing by the neural network and the difference between the prediction information output by the neural network after the detection of the original sample image and the scrambled sample image. The smaller the consistency is, the better the training effect on the difference formed by the scrambling processing is.

At a training operation 5, network parameters of the neural network are adjusted according to the first difference and the third difference.

The first difference and the third difference are used as the basis for updating the neural network, such as the convolutional neural network, so that the parameter update is more effective, which is beneficial to enabling the trained neural network to accurately perform face positioning and weakening the face jitter of two adjacent frames in a video.

The training of the neural network is an iterative process, and a training termination condition is required, such as the number of iteration trainings, or a convergence condition. Therefore, it can be determined whether the training of the neural network satisfies a predetermined training termination condition; if not satisfied, the network parameters of the neural network are adjusted according to the first difference and the third difference, and the neural network is continuously trained using the adjusted network parameters until the predetermined training termination condition is satisfied; and if satisfied, the training of the neural network is completed.

The neural network after the foregoing training can be used for face detection. In addition, in the embodiments, the face key-point information and the face attribute information are obtained by performing face detection on the image to be processed. However, persons skilled in the art should understand that in practical applications, other modes may also be adopted to obtain the face key-point information, for example, the face key-point is detected individually, which is not limited in the embodiments of the present disclosure.

In an optional solution, the face attribute information includes at least one of the following: gender information, race information, age information, facial movement information, facial attachment information, or facial angle information. The facial movement information is used to indicate a face movement in the face image, including but not limited to a mouth open movement, an eye close movement, etc. The facial attachment information is used to indicate information of the face attachment in the facial image, including but not limited to whether glasses or a mask is worn, whether a beard is present, etc. The facial angle information is used to indicate the angle of the current face in the face image, and the face angle information can be used to determine whether the current face is a front face or a side face.

According to one or more embodiments of the present disclosure, the facial movement information includes at least one of the following: eye close information or mouth open information. The facial attachment information includes at least one of the following: information on whether a beard is present, information on whether a mask is worn, or information on whether glasses are worn. The facial angle information includes at least one of the following: facial horizontal angle information, facial rotation angle information, or facial pitch angle information. The horizontal axis is X axis, the axis perpendicular to the horizontal axis is Y axis, the X axis and the Y axis are intersected at an origin O, and the axis perpendicular to an XOY plane through the origin O is Z axis, so that a coordinate system is formed. The facial horizontal angle information represents an angle between the face and the X axis in the XOY plane for indicating whether the current face in the face image is a side face or a front face. The facial rotation angle information represents an angle between the face and the X axis in an XOZ plane for indicating whether the current face in the face image is tilted. The facial pitch angle information represents an angle between the face and the Y axis in a YOZ plane for indicating whether the current face in the face image is looking down or looking up.

Different face attribute information represents different face situations. On this basis, the matching image processing modes are selected to perform targeted and differentiated processing.

At block S204, the image corresponding to the first region and/or the image corresponding to the second region in the at least one face region image is determined.

The first region is a skin region, and the second region includes at least a non-skin region.

Depending on the selected image processing modes, the specific face regions are also different, which is the first region, or the second region, or both the first region and the second region.

In an optional mode, the first region and the second region are determined by means of a preset standard face template.

For example, for each face region image, the preset standard face template is obtained, where the standard face template includes standard face key-point information. Matching deformation is performed on the standard face template according to the face key-point information and the standard face key-point information in the face region image. The first region and/or the second region in the face region image is determined according to the deformed standard face template. In the standard face template, different face key-points are annotated, so that the face key-points with the same annotation form different regions, and thus, after the standard face template is deformed, the face key-point in the face region image corresponding to the standard face template may also have the same annotation as the face key-point in the standard face template, to determine the first region and/or the second region in the face region image. Alternatively, in addition to the standard face key-point information, the standard face template further includes a first preset region for indicating the skin region in the standard face, and a second preset region for indicating the non-skin region in the standard face. In this case, after the standard face template is deformed, the first region and the second region in the face region image may be determined according to the first preset region and the second preset region thereof.

In the standard face template, the standard face is divided into a first preset region and a second preset region according to the standard face key-point information. The first preset region is a skin region, such as the forehead, nose bridge, cheek, and chin. The second preset region includes at least a non-skin region, such as eyebrows, eyes, and mouth. After the standard face template is deformed into a template that is consistent with the face in the face region image, it can be determined that the region corresponding to the first preset region in the face region image is the first region, and the region corresponding to the second preset region is the second region.

In addition, in some cases, non-skin elements may also exist in the first region, such as hair scattered on the forehead. In this case, According to one or more embodiments of the present disclosure, a region in the face region image corresponding to the first preset region in the deformed standard face template is determined as a first initial region, the pixels for indicating non-skin in the image corresponding to the first initial region are then screened, a region with the pixels for indicating non-skin screened in the first initial region is determined as the first region, and a region in the face region image corresponding to the second preset region in the deformed standard face template and a portion screened from the first initial region are determined as the second region.

For another example, for each face region image, a preset standard face template is obtained, where the standard face template includes standard face key-point information. The face region image is deformed according to the face key-point information in the face region image and the standard face template. The first region and/or the second region is determined according to the deformed face region image. After the face region image is deformed to be consistent with the standard face template, the first region and/or the second region in the deformed face region image is determined according to the information of the standard face key-point in the standard face template and/or the information of the first and second preset regions.

According to one or more embodiments of the present disclosure, the obtained preset standard face template is a standard face template required for current image processing determined from at least two different standard face templates included in a preset standard face template set.

It should be noted that, in the embodiments of the present disclosure, the corresponding key-points of no matter the standard face template or the face region image after the deformation are aligned in position or close to a small distance threshold, so that the standard face template and the face region image are consistent as far as possible.

However, the mode for determining the first region and the second region by using the standard face template is not limited. In an actual application, a user may also voluntarily select a region to be processed, that is, this operation determines an image corresponding to the first region and/or an image corresponding to the second region in the face region image according to user input information. The input mode of the user input information is implemented in any appropriate mode, for example, the user circles the region to be processed with a mouse, or the user touches the region to be processed with a finger, or the electronic device determines the corresponding region to be processed according to an option selected by the selection operation of the user from the provided face processing region options. After receiving the user input information, the electronic device determines the image corresponding to the first region and/or the image corresponding to the second region in the face region image according to the user input information. On this basis, a subsequent operation of processing the image corresponding to the first region and/or the image corresponding to the second region in the face region image is performed at least according to the face attribute information in the face region image.

At block S206, for the at least one face region image, the image corresponding to the first region and/or the image corresponding to the second region in the face region image is processed according to the face attribute information and the face key-point information in the face region image.

The processing includes at least one of the following: facial whitening, facial ruddy, face-lifting, eye enlargement, eye enhancement, eye size correction, facial skin grinding, tooth whitening, or facial enhancement.

The facial whitening is used for whitening the skin region of the face. The facial ruddy is used for performing ruddy processing on the skin region of the face. The face-lifting is used for thinning the face according to the face key-point information. The eye enlargement is used for enlarging the eyes in the face. The eye enhancement is used for performing at least one of highlighting, color changing, and zooming in/out on the pupils of the eyes in the face. The eye size correction is used for making the size uniform if two eyes of the face are different in size. The facial skin grinding is used for grinding the skin region of the face. The tooth whitening is used for whitening the exposed teeth when a person is in a mouth open state. The facial enhancement is used for enhancing the stereoscopic effect of the forehead, nose, and cheek of the face. The facial whitening, facial ruddy, and facial skin grinding require at least the skin region of the face, i.e., the information of the first region. The face-lifting requires at least face key-point information. The eye enlargement, eye enhancement, eye size correction, and tooth whitening require at least the face key-point information and/or the non-skin region of the face, i.e., the information of the second region. The facial enhancement requires at least the face key-point information and the skin region of the face, i.e., the information of the first region.

Based on the foregoing processing mode, for each face region image, when the image corresponding to the first region and/or the image corresponding to the second region in the face region image is processed at least according to the face attribute information in the face region image, a facial processing parameter corresponding to the face attribute information in the face region image is determined, and the image corresponding to the first region and/or the image corresponding to the second region in the face region image is then determined at least according to the face processing parameter.

If the face attribute information includes the gender information, a facial processing parameter corresponding to the gender information is determined, where the beauty processing intensity in facial processing parameters corresponding to the male is lower than the beauty processing intensity in facial processing parameters corresponding to the female. The beauty processing intensity includes at least one of the following: whitening intensity, ruddy intensity, skin grinding intensity, or face-lift proportion.

If the face attribute information includes race information, a facial processing parameter of a tone corresponding to a skin color race of the face region image indicated by the race information in the face attribute information is determined, where different skin color races correspond to facial processing parameters of different tones.

If the face attribute information includes facial movement information, a processing parameter of a facial specific part corresponding to the facial movement information is determined. For example, if the facial movement information includes mouth open information, the whitening processing parameters of the teeth are determined. For another example, if the facial movement information includes eye close information, it is determined that the facial processing parameter does not include a processing parameter for processing the eyes, such as an eye enlargement processing parameter and/or an eye enhancement processing parameter and/or an eye size correction parameter.

If the face attribute information includes facial attachment information, the face processing parameter is determined according to the face attachment information, where the determined facial processing parameter does not include a processing parameter of the facial specific part occluded by the facial attachment in the facial region image. For example, if the facial attachment information indicates the presence of worn glasses in the face region image, the processing parameter of the facial specific part occluded by the facial attachment includes at least one of the following: an eye enlargement processing parameter, an eye enhancement processing parameter, or an eye size correction parameter.

If the face attribute information includes facial angle information, a facial processing parameter corresponding to a face angle of the face region image indicated by the facial angle information is determined, where different face angles correspond to different facial processing parameters.

During the image processing, the processing is performed based on the first region and the second region determined in block S204. That is, when the image corresponding to the first region and/or the image corresponding to the second region in the face region image is processed according to the face attribute information and the face key-point information in the face region image, in an optional mode, a preset standard face template is obtained, where the standard face template includes standard face key-point information; matching deformation is performed on the standard face template according to the face key-point information in the face region image and the standard face key-point information; and the image corresponding to the first region and/or the image corresponding to the second region is processed at least according to the face attribute information in the face region image and the deformed standard face template. In another optional mode, if the standard face template further includes, in addition to the standard face key-point information, a first face region for indicating the skin region in the standard face and a second preset region for indicating the non-skin region in the standard face, when the image corresponding to the first region and/or the image corresponding to the second region is processed at least according to the face attribute information in the face region image and the deformed standard face template, the first region and the second region in the face region image are determined at least according to the first preset region and the second preset region in the deformed standard face template, and the image corresponding to the first region and/or the image corresponding to the second region is processed according to the face attribute information and the determined first and second regions in the face region image. Further, a region in the face region image corresponding to the first preset region in the deformed standard face template is determined as a first initial region, pixels for indicating non-skin in an image corresponding to the first initial region are screened, a region with the pixels for indicating non-skin screened in the first initial region is determined as the first region, and a region in the face region image corresponding to the second preset region in the deformed standard face template and a portion screened from the first initial region are determined as the second region. In another optional mode, a preset standard face template is obtained, where the standard face template includes standard face key-point information; the face region image is deformed according to the face key-point information in the face region image and the standard face template; and the image corresponding to the first region and/or the image corresponding to the second region is processed according to the face attribute information, the original face region image, and the deformed face region image.

After the specific processing mode is determined, each face region image is processed by using at least one of the following optional modes, including but not limited to:

Mode 1, when the face attribute information includes the gender information, and the processing of the face region image includes facial whitening, if the gender information in the face attribute information indicates that the face region image to be processed is a male face image, the whitening intensity corresponding to the male is selected, where the whitening intensity corresponding to the male is lower than the whitening intensity corresponding to the female.

In general, the whitening intensity ranges from 0 to 1, where 0 is the weakest and 1 is the strongest. For example, if the whitening intensity of the female is 0.5, the whitening intensity of the male is 0.3, 0.4, or 0.2, etc. The specific whitening intensity and the implementation of facial whitening are appropriately set by persons skilled in the art according to actual requirements, which is not limited in the embodiments.

Mode 2, when the face attribute information includes the gender information, and the processing of the face region image includes facial ruddy, if the gender information in the face attribute information indicates that the face region image to be processed is a male face image, the ruddy intensity corresponding to the male is selected, where the ruddy intensity corresponding to the male is lower than the ruddy intensity corresponding to the female.

In general, the ruddy intensity ranges from 0 to 1, where 0 is the weakest and 1 is the strongest. For example, if the ruddy intensity of the female is 0.5, the ruddy intensity of the male is 0.3, 0.4, or 0.2, etc. The specific ruddy intensity and the implementation of facial ruddy are appropriately set by persons skilled in the art according to actual requirements, which is not limited in the embodiments.

Mode 3, when the face attribute information includes the race information, and the processing of the face region image includes facial ruddy, if the race information in the face attribute information indicates that the face region image to be processed is an image of the yellow race, a facial processing parameter of a first tone is selected; if the race information in the face attribute information indicates that the face region image to be processed is an image of the white race, a facial processing parameter of a second hue is selected; and if the race information in the face attribute information indicates the face image to be processed is an image of the black race, a facial processing parameter of a third tone is selected. For example, the yellow race uses a yellowish tone, the white race uses a reddish tone, and the black race uses a blackish tone, etc. The specific tone and the implementation of facial ruddy are appropriately set by persons skilled in the art according to actual requirements, which is not limited in the embodiments.

Mode 4, when the face attribute information includes the facial movement information, and the processing of the facial region image includes tooth whitening, if the facial movement information in the face attribute information indicates that the face region image to be processed has a mouth open movement, tooth whitening parameters such as the tooth whitening intensity are selected.

In general, the tooth whitening intensity ranges from 0 to 1, where 0 is the weakest and 1 is the strongest. The specific tooth whitening intensity and the implementation of tooth whitening are appropriately set by persons skilled in the art according to actual requirements, which is not limited in the embodiments.

Mode 5, when the face attribute information includes the facial attachment information, and the processing of the face region image includes at least one of eye enlargement, eye enhancement, and eye size correction, if the facial attachment information in the face attribute information indicates that there is worn glasses in the face region image to be processed, the facial processing parameter that does not include any of the eye enlargement, the eye enhancement, and the eye size correction is selected.

That is, if the current face in the face region image is wearing glasses, no eye beautification is performed on the glasses.

According to one or more embodiments of the present disclosure, the attribute of the glasses is further determined. If the glasses are opaque glasses, such as sunglasses, no eye beautification is performed on the glasses. However, if the glasses are transparent glasses, such as normal transparent glasses for the myopia or glasses for the presbyopia, eye beautification is performed on the glasses. However, it should be understood by persons skilled in the art that in practical applications, the attributes of the glasses are not distinguished, and a unified processing mode may be adopted.

Mode 6, when the face attribute information includes the facial angle information, and the processing of the face region information includes the face-lifting, if the facial angle information indicates that the face in the face region image to be processed is the side face, a face processing parameter for side face-lifting is selected; and if the facial angle information indicates that the face in the face region image to be processed is a front face, a facial processing parameter for front face-lifting is selected. The specific implementation of face-lifting is appropriately set by persons skilled in the art according to actual requirements, which is not limited in the embodiments.

Mode 7, when the face attribute information includes the gender information, and the processing of the face region image includes face-lifting, if the gender information in the face attribute information indicates that the face region image to be processed is an image of the male, a facial processing parameter corresponding to the face-lifting proportion of the male is selected, where the face-lifting proportion corresponding to the male is lower than the face-lifting proportion corresponding to the female.

In general, the face-lifting proportion ranges from 0 to 1, where 0 is the weakest and 1 is the strongest. For example, if the face-lifting proportion of the female is 0.5, the face-lifting proportion of the male is 0.3, 0.4, or 0.2, etc. The specific face-lifting proportion and the implementation of face-lifting are appropriately set by persons skilled in the art according to actual requirements, which is not limited in the embodiments.

In addition, it should be noted that if the processing of the face region image includes at least one of facial whitening, facial ruddy, or facial skin grinding, after the image corresponding to the first region and/or the image corresponding to the second region in the face region image is subjected to at least one of facial whitening, facial ruddy, or facial skin grinding, smooth processing is further performed on the face region image subjected to the foregoing processing. By further performing smooth processing on the processed face region image, it is beneficial to smoothing the face edge in the face region image and naturally transitioning with other image portions.

According to the technical solutions provided by the embodiments, at least one face region image in the image to be processed and face attribute information in the at least one face region image are obtained, where the face attribute information can indicate faces with different attributes, and then, for at least one face region image, image processing solutions matching the face attribute information, such as a beautification solution, are used for different processing.

During specific processing, the first region and the second region in the face region image are distinguished, and image processing is performed only on the first region, or only on the second region, or on both the first region and the second region. By means of the solutions provided by the embodiments, on the one hand, the beautification requirements of the faces of different attributes are different, and different intelligent facial processing such as beautification, artistry, cartoonization, makeup, and entertainment is performed on the faces of different attributes, which is beneficial to reflecting the differences between different people and meeting different requirements of different people. On the other hand, for non-skin regions in the face, the same intelligent facial processing is performed on the non-skin region, which causes distortion of the intelligent facial processing, resulting in unnatural or fake facial processing effect, and in turn reducing the intelligent facial processing effect. Therefore, distinguishing the first region and the second region in the face region image is beneficial to improving the intelligent facial processing effect, satisfying the user's differentiated intelligent facial processing requirement, and improving the intelligent facial processing effect.

The face image processing method of the embodiments may be executed by any appropriate device having image or data processing capability, including but not limited to: a camera, a terminal, a mobile terminal, a PC, a server, an on-board device, an entertainment device, and an advertising device, etc.

Figure 3:
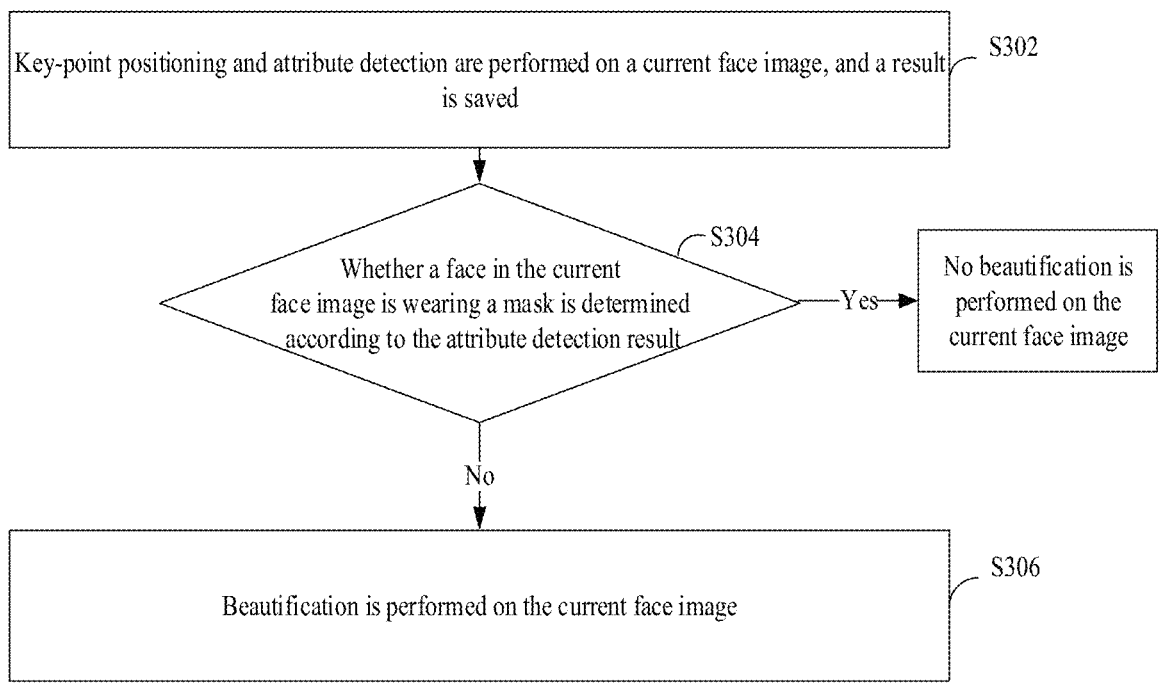
FIG. 3 is a flowchart of operations of yet another face image processing method according to embodiments of the present disclosure.

Referring to FIG. 3, illustrated is a flowchart of operations of a face image processing method according to embodiments of the present disclosure.

The embodiments describe the face image processing solution of the present disclosure in the form of a specific example. The face image processing method in the embodiments includes the following operations.

At block S302, key-point positioning and attribute detection are performed on a current face image, and a result is saved.

At block S304, whether a face in the current face image is wearing a mask is determined according to the attribute detection result; if the mask is worn, no beautification is performed on the current face image; and if no mask is worn, block S306 is performed.

In the embodiments, the mask includes, but is not limited to, a face mask, and a mask, etc.

At block S306, if no mask is worn, beautification is performed on the current face image.

In the following, a specific example of the beautification process is taken as an example, but persons skilled in the art should understand that the examples shown herein are merely exemplary, and other similar beautification processes are also applicable to the solutions proposed by the embodiments of the present disclosure.

At operation 1, a first region and a second region of a face in the current face image are determined.

At operation 2, overall whitening and ruddy processing is performed on the current face image to brighten the overall color of the current face image.

The whitening processing is performed on the current face image according to the detected age and the whitening intensity of the set different age groups. In general, the whitening intensity of the male is smaller than that of the female of the same age group.

When the ruddy processing is performed on the current face image, in the examples, no ruddy processing is performed on the male. For the female, the ruddy mode is different according to the race difference. The yellow race uses a yellowish tone, the white race uses a reddish tone, and the black race uses a blackish tone.

At operation 3, face-lifting processing is performed.

The face-lifting proportion for the male is generally smaller than that for the female. In addition, whether the face is a front face or a side face is determined according to the facial horizontal angle and the facial rotation angle; if the face is a front face, face-lifting processing is performed on the contours of both sides of the face; and if the face is a side face, face-lifting processing is performed on only one side of the face.

At operation 4, eye enlargement and eye enhancement are performed.

First, whether there is a situation of wearing sunglasses, glasses or eye close is determined according to the detected attribute value; if yes, no eye processing is performed; otherwise, whether there is a situation that two eyes are different in size is determined, and if yes, the eye size is corrected, and then eye enlargement and eye enhancement (such as pupil blackening) are performed.

At operation 5, facial skin grinding is performed.

In the examples, the entire facial skin grinding process includes four operations in total, i.e., facial whitening and ruddy, freckle skin grinding, removal of acne and nevus, and removal of under-eye dark circle and under-eye puffiness. During the implementation, the image region containing a face of the original image in the RGB color space is cut out to be grounded individually, and then put back to the original image.

The processing flow of a specific skin grinding process is as follows.

1. An image region containing a face of an original image in the RGB color space is cut out (annotated as "FaceReg" image).

2. A "warp" (deformation) operation is performed on a standard face "mask" (a standard face template) by means of the detected face key-point information to obtain a "warped mask".

The standard face "mask" contains standard face key-point information. In actual processing, an alignment operation (e.g., coordinate alignment) is performed by persons skilled in the art according to the detected face key-point information and the standard face key-point information in the standard face "mask", to achieve the deformation of the standard face "mask". For example, the coordinates of the key-point on the standard face "mask" image and the coordinates of the detected face key-point are used as inputs, to respectively calculate the fitting functions of the X direction and the Y direction, and then the pixel points on the "FaceReg" image are fit and interpolated to the target point to achieve the deformation of the standard face "mask".

Figure 4:
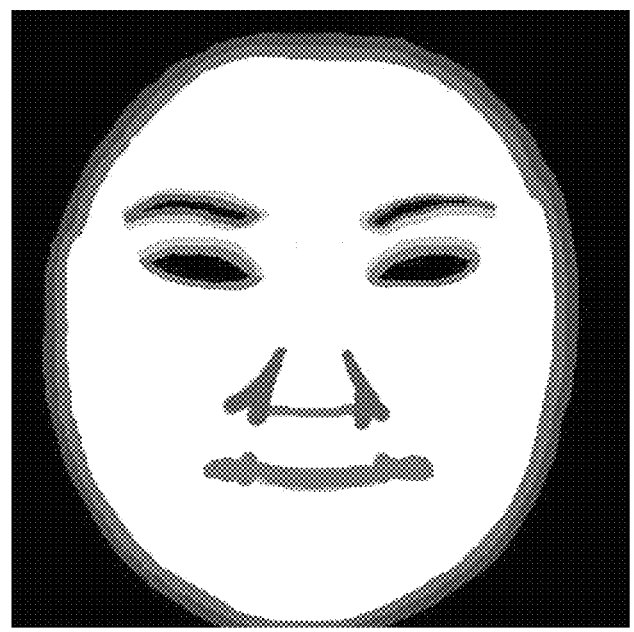
FIG. 4 is a schematic diagram of a standard face template in the embodiments shown in FIG. 3.
Figure 5:
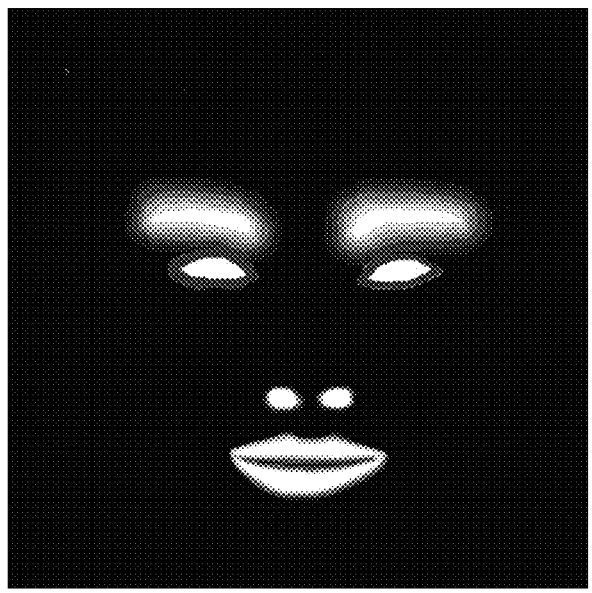
FIG. 5 is a schematic diagram of another standard face template in the embodiments shown in FIG. 3.

The standard face "mask" is preset, as shown in FIG. 4. In FIG. 4, the white region indicates that skin grinding is required, and the black region indicates that no skin grinding is performed, thereby retaining details of the eyebrows, eyes, lips, nasal ditch, and the like. In an optional mode, multiple-level subdivision is also performed on regions that require skin grinding, such as multiple different levels of white, and whiter indicates greater skin grinding intensity. Further According to one or more embodiments of the present disclosure, in order to retain/enhance the detail and sharpness of the specific region, the face image divided by the skin grinding region and the non-skin grinding region is further processed using the standard face "mask" containing a specific region, as shown in FIG. 5. In FIG. 5, the white region is a non-skin grinding region. Certainly, in practical applications, it is also possible to distinguish the skin grinding region from the non-skin grinding region using only the standard face "mask" shown in FIG. 5, where the white region is the non-skin grinding region, and in the facial region within he face contour key-points, the region other than the white region is the skin grinding region.

3. The "warped mask" is further screened by combining the color information of the "FaceReg" image, and the corresponding non-skin pixels in the "warped mask" are set to zero.

For example, if a pixel that is not a skin tone is determined on the "FaceReg" image, the pixel value at the same position on the "warped mask" is set to zero.

By means of this operation, the non-skin pixels in the skin grinding region are removed.

4. "Blobdetect" (blob detection) is performed on the "FaceReg" image to detect positions of the acne and nevus on the face skin region, and the detection results are screened using the skin color and gradient information to delete the error detection, and the "blob" position in the "FaceReg" image is repaired using the "image paint" method to achieve removal of acne/nevus.

For example, in a pixel gradient map corresponding to the "FaceReg" image, there is a pixel in which the pixel value jumps, and the region corresponding to the pixel in which the jump occurs may be a blob region (a region having acne or nevus); whether the pixel in which the jump occurs belongs to the skin pixel is determined; if yes, the pixel value at which the jump occurs is set to 0 (indicating that it is not a blob); if not, the pixel value at which the jump occurs is set to 255 (indicating a blob). After the information of the blob region is obtained, such as a specific location, the pixels of these positions are repaired using a correlation algorithm such as a fast marching repair algorithm.

5. "Guided filter" is performed on the "warped mask" by using "FaceReg" to make the edges smooth and transition naturally, annotated as "smooth warped mask".

6. Gaussian blur and median blur are performed on the "FaceReg" image, and the results thereof are combined as a blurred face image, annotated as "BluredFaceReg=max (gaussblur, medianblur)", where "gaussblur" indicates Gaussian blur, and "medianblur" indicates median blur.

By means of this operation, the initial skin grinding of the "FaceReg" image is achieved, and the highlight and low-light effects in the "FaceReg" image are retained.

7. The "smooth warped mask" image is divided by 255.0 to be used as a matting image, and "BluredFaceReg" and "FaceReg" are superimposed to obtain an image after skin grinding, annotated as "smooth FaceReg".

After the "smooth warped mask" image is divided by 255.0, the pixel values therein are normalized to the range of [0, 1.0] to be used as the matting image.

An optional skin grinding calculation formula is as follows:

smooth FaceReg=smooth warped mask*BluredFaceReg+(1.0−smooth warped mask)*FaceReg 8. "Guided filter" is performed on the "smooth FaceReg" by using "FaceReg" to make the edges smooth and transition naturally, annotated as "guided smooth FaceReg".

After the foregoing processing, an image in which the face region is blurred is obtained. However, in this case, there is a possibility that the transition at the blurred edge of the face region and the clear boundary is unnatural. With this regard, this processing performs a smoothing operation using "guided filter", to make the transition of the boundary smooth.

9. The "guided smooth FaceReg" is put back to the original image, and the skin grinding intensity is controlled in an "alphablending" mode.

An optional skin grinding intensity formula is as follows:

FaceReg=alpha*guided smooth FaceReg+(1.0−alpha)*FaceReg, where the value range of "alpha" is [0, 1.0] for controlling the skin grinding intensity.

The larger the "alpha" value is, the heavier the degree of skin grinding is, and vice versa.

In addition, in the actual skin grinding processing, the skin grinding intensity for the male is lower than that for the female of the same age group, for example, the skin grinding intensity for the male is set to be 0.856 times that for the female. Different age groups correspond to different skin grinding intensities. Assuming that the basic skin grinding intensity is "alpha", then 0.5*alpha is used for the age of [0, 10], 0.8*alpha for [10, 20], 1.0*alpha for [20, 30], 0.9*alpha for [30, 45], 0.75*alpha for [45, 60], and 1.1*alpha for [60, 100], etc. However, persons skilled in the art should understand that the above is merely illustrative, and may be appropriately set by persons skilled in the art according to actual conditions in actual use.

By means of the foregoing process, the skin grinding processing of the face image is achieved. However, it should be noted that, in the foregoing process, the determination of the skin grinding region and the non-skin grinding region can be understood as the determination of the first region and the second region. The facial whitening and the ruddy processing are not described in detail in the foregoing process, and can be implemented with reference to the mode in operation 2.

In addition, on the basis of the above-mentioned skin grinding processing, the whitening and ruddy processing can be further performed on the face region after the skin grinding, which can be implemented with reference to operation 2, and details are not described herein again. It is also possible to remove under-eye dark circle and under-eye puffiness, for example, slight skin grinding is first performed on the region of under-eye dark circle and/or under-eye puffiness (e.g., using "guided filter"), and then the color value of the normal skin pixels around the region of under-eye dark circle and/or under-eye puffiness is extracted to be filled back into the region of under-eye dark circle and/or under-eye puffiness.

At operation 6, if the mouth is detected to be open, the tooth whitening is performed; otherwise, no tooth whitening is performed.

In addition, the image corresponding to the first region and/or the image corresponding to the second region in the face region image is also determined according to the user input information, and then the corresponding region of the face is modified according to the information corresponding to the facial enhancement requirement selected by the user, to enhance the facial effect, such as raising the nose bridge, and enhancing the stereoscopic effect of the T-zone or the face region, etc.

For example, if it is determined according to the user input information that the user needs to process the nose region, the nose region is determined as the first region, and then a corresponding image of the nose region is determined, and the nose bridge raise-up is performed on the image. When the nose bridge is raised, the coordinates of the center point and the deformation region before and after the deformation are calculated using the key-points of the nose bridge region, and the regions at both sides of the nose bridge are deformed to the middle, so as to narrow the nose bridge. Similar to the nose bridge raise-up, if it is determined that the user needs to enhance the stereoscopic effect of the facial region according to the user input information and the facial enhancement demand information, the region indicated by the user input information is determined as the first region, and then the corresponding image is determined, so as to perform stereoscopic enhancement processing on the image. During the stereoscopic enhancement of the facial region, the effect of enhancing the stereoscopic effect can be achieved in the mode of adding highlights and low-light to specific regions of the face, such as adding bright light (highlight) at the position between the eyebrows, nose bridge, cheeks and chin, and adding shadow (low light) under the cheekbone. Similarly, during the enhancement of the stereoscopic effect of the T region, the T region refers to a region between the eyebrows and the nose bridge, and the image corresponding to the region indicated by the user input information is processed. The stereoscopic effect of the T region can be enhanced by increasing the highlight to the region between the eyebrows and the nose bridge, and raising the nose bridge.

It should be noted that the order of operations 2 to 5 is merely illustrative. Operations 2 to 5 may be performed in an order different from the above order, for example, may be performed in parallel, which is not limited in the examples.

By means of the embodiments, according to different face attribute information, different face beautification processing strategies are set to beautify the face image, so that the beautification effect of the face image is more personalized, and the distinguishing features of the face are more prominent, thereby improving the image quality and effect after the beautification of the face image. In addition, the face key-point and attribute detection performed on the face image can simultaneously detect multiple faces in the same face image, to obtain face key-point information and face attribute information of multiple faces. Therefore, in the solutions of the embodiments of the present disclosure, the face image including a single face can be beautified, or the face image including multiple faces can be beautified simultaneously.

The face image processing method of the embodiments may be executed by any appropriate device having image or data processing capability, including but not limited to: a camera, a terminal, a mobile terminal, a PC, a server, an on-board device, an entertainment device, and an advertising device, etc.

According to the technical solutions provided by the embodiments of the present disclosure, the at least one face region image in the image to be processed and the face attribute information in the at least one face region image are obtained, where the face attribute information can indicate faces with different attributes, e.g., a male face, a female face, and face of different ages, etc., and then, for at least one face region image, image processing solutions matching the face attribute information, such as a beautification solution, are used for different processing. During specific processing, the first region and the second region in the face region image are distinguished, and image processing is performed only on the first region, or only on the second region, or on both the first region and the second region. By means of the solutions provided by the embodiments of the present disclosure, on the one hand, the beautification requirements of the faces of different attributes are different, and the technical solutions of the present disclosure are used for performing different intelligent facial processing such as beautification, artistry, cartoonization, makeup, and entertainment on the faces of different attributes, which can effectively reflect the differences between different people and meet different requirements of different people. On the other hand, for non-skin regions in the face, such as eyebrows, eyes, hair, and beards, the same intelligent facial processing is performed on the non-skin region, which causes distortion of the intelligent facial processing, resulting in unnatural or fake facial processing effect, and in turn reducing the intelligent facial processing effect. Therefore, distinguishing the first region and the second region in the face region image is beneficial to improving the intelligent facial processing effect.

In view of the above, the face image processing solutions provided by the embodiments of the present disclosure are beneficial to satisfying the user's differentiated intelligent facial processing requirements and improving the intelligent facial processing effect.

Figure 6:
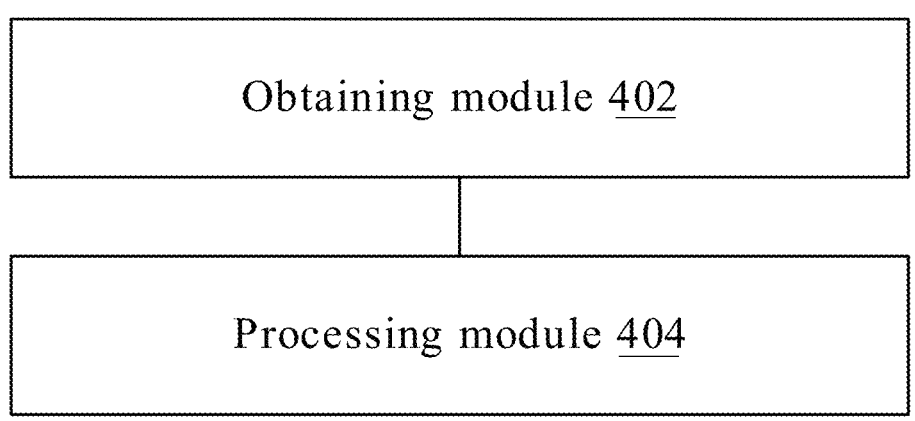
FIG. 6 is a structural block diagram of a face image processing apparatus according to embodiments of the present disclosure.

Referring to FIG. 6, illustrated is a structural block diagram of a face image processing apparatus according to embodiments of the present disclosure.

The face image processing apparatus in the embodiments includes: an obtaining module 402, configured to perform face detection on an image to be processed, and obtain at least one face region image included in the image to be processed and face attribute information in the at least one face region image; and a processing module 404, configured to process an image corresponding to a first region and/or an image corresponding to a second region in the face region image at least according to the face attribute information in the face region image for the at least one face region image, where the first region is a skin region, and the second region includes at least a non-skin region.

The face image processing apparatus of the embodiments is configured to realize the corresponding face image processing method in the foregoing multiple method embodiments, and has the beneficial effect of the corresponding method embodiments. Details are not described herein again.

Figure 7:
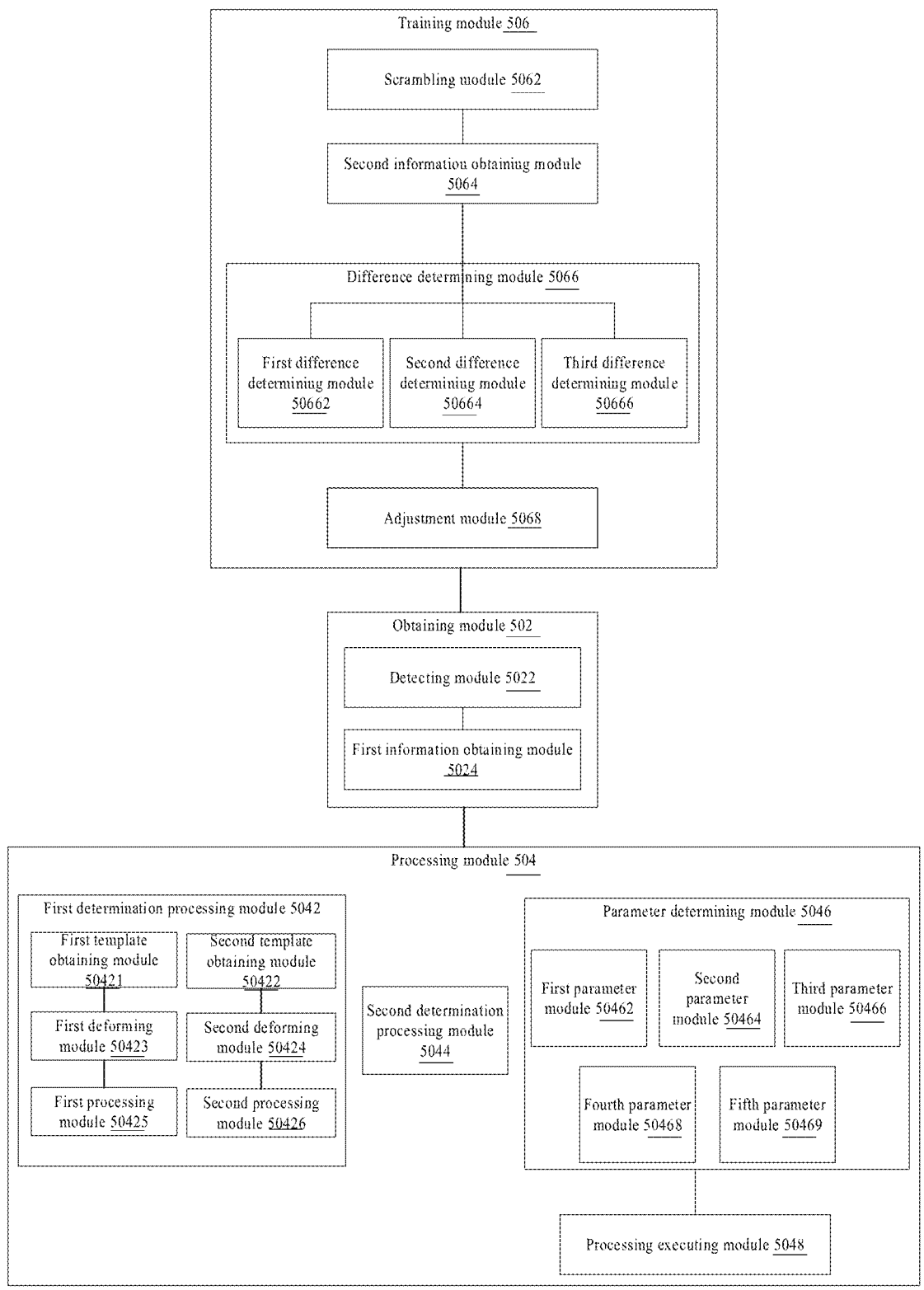
FIG. 7 is a structural block diagram of another face image processing apparatus according to embodiments of the present disclosure.

Referring to FIG. 7, illustrated is a structural block diagram of another face image processing apparatus according to embodiments of the present disclosure.

The face image processing apparatus in the embodiments includes: an obtaining module 502, configured to perform face detection on an image to be processed, and obtain at least one face region image included in the image to be processed and face attribute information in the at least one face region image; and a processing module 504, configured to process an image corresponding to a first region and/or an image corresponding to a second region in the face region image at least according to the face attribute information in the face region image for the at least one face region image, where the first region is a skin region, and the second region includes at least a non-skin region.

According to one or more embodiments of the present disclosure, the obtaining module 502 is further configured to obtain face key-point information in the at least one face region image. The processing module 504 includes a first determination processing module 5042, configured to process the image corresponding to the first region and/or the image corresponding to the second region in the face region image according to the face attribute information and the face key-point information in the face region image for the at least one face region image.

According to one or more embodiments of the present disclosure, the processing module 504 further includes: a second determination processing module 5044, configured to determine the image corresponding to the first region and/or the image corresponding to the second region in the face region image according to user input information before processing the image corresponding to the first region and/or the image corresponding to the second region in the face region image at least according to the face attribute information in the face region image for the at least one face region image.

According to one or more embodiments of the present disclosure, the face attribute information includes at least one of the following: gender information, race information, age information, facial movement information, facial attachment information, or facial angle information.

According to one or more embodiments of the present disclosure, the facial movement information includes at least one of the following: eye close information or mouth open information; and/or, the facial attachment information includes at least one of the following: information on whether a beard is present, information on whether a mask is worn, or information on whether glasses are worn; and/or the facial angle information includes at least one of the following: facial horizontal angle information, facial rotation angle information, or facial pitch angle information.

According to one or more embodiments of the present disclosure, the processing module 504 processes the image corresponding to the first region and/or the image corresponding to the second region in the face region image in terms of at least one of the following: facial whitening, facial ruddy, face-lifting, eye enlargement, eye enhancement, eye size correction, facial skin grinding, teeth whitening, or facial enhancement.

According to one or more embodiments of the present disclosure, the processing module 504 includes: a parameter determining module 5046, configured to determine a facial processing parameter corresponding to the face attribute information in the face region image for the at least one face region image; and a processing executing module 5048, configured to process the image corresponding to the first region and/or the image corresponding to the second region in the face region image at least according to the facial processing parameter.

According to one or more embodiments of the present disclosure, the parameter determining module 5046 includes: a first parameter module 50462, configured to determine, if the face attribute information includes the gender information, a facial processing parameter corresponding to the gender information, where the beauty processing intensity in facial processing parameters corresponding to the male is lower than the beauty processing intensity in facial processing parameters corresponding to the female.

According to one or more embodiments of the present disclosure, the beauty processing intensity includes at least one of the following: whitening intensity, ruddy intensity, skin grinding intensity, or face-lift proportion.

According to one or more embodiments of the present disclosure, the parameter determining module 5046 includes: a second parameter module 50464, configured to determine, if the face attribute information includes the race information, a facial processing parameter of a tone corresponding to a skin color race of the face region image indicated by the race information in the face attribute information, where different skin color races correspond to facial processing parameters of different tones.

According to one or more embodiments of the present disclosure, the parameter determining module 5046 includes: a third parameter module 50466, configured to determine, if the face attribute information includes the facial movement information, a processing parameter of a facial specific part corresponding to the facial movement information.

According to one or more embodiments of the present disclosure, the third parameter module 50466 is configured to determine, if the facial movement information includes the mouth open information, a whitening processing parameter of teeth.

According to one or more embodiments of the present disclosure, the parameter determining module 5046 includes: a fourth parameter module 50468, configured to determine, if the face attribute information includes the face attachment information, the face processing parameter according to the face attachment information, where the determined facial processing parameter does not include a processing parameter of the facial specific part occluded by the facial attachment in the facial region image.

According to one or more embodiments of the present disclosure, if the facial attachment information indicates the presence of worn glasses in the face region image, the processing parameter of the facial specific part occluded by the facial attachment includes at least one of the following: an eye enlargement processing parameter, an eye enhancement processing parameter, or an eye size correction parameter.

According to one or more embodiments of the present disclosure, the parameter determining module 5046 includes: a fifth parameter module 50469, configured to determine, if the face attribute information includes the facial angle information, a facial processing parameter corresponding to a face angle of the face region image indicated by the facial angle information in the face attribute information, where different face angles correspond to different facial processing parameters.

According to one or more embodiments of the present disclosure, the first determination processing module 5042 includes: a first template obtaining module 50421, configured to obtain a preset standard face template, where the standard face template includes standard face key-point information; a first deforming module 50423, configured to perform matching deformation on the standard face template according to the face key-point information in the face region image and the standard face key-point information; and a first processing module 50425, configured to process the image corresponding to the first region and/or the image corresponding to the second region at least according to the face attribute information in the face region image and the deformed standard face template.

According to one or more embodiments of the present disclosure, the standard face template further includes a first preset region for indicating a skin region in a standard face, and a second preset region for indicating a non-skin region in the standard face. The first processing module 50425 includes: a first region determining unit (not shown), configured to determine the first region and/or the second region in the face region image at least according to the first preset region and/or the second preset region in the deformed standard face template; and a first image processing unit (not shown), configured to process the image corresponding to the first region and/or the image corresponding to the second region according to the face attribute information and the determined first region and/or the second region in the face region image.

According to one or more embodiments of the present disclosure, the first region determining unit is configured to determine a region in the face region image corresponding to the first preset region in the deformed standard face template as a first initial region; screen pixels for indicating non-skin in an image corresponding to the first initial region; determine a region with the pixels for indicating non-skin screened in the first initial region as the first region; and determine a region in the face region image corresponding to the second preset region in the deformed standard face template and a portion screened from the first initial region as the second region.

According to one or more embodiments of the present disclosure, the first determination processing module 5042 includes: a second template obtaining module 50422, configured to obtain a preset standard face template, where the standard face template includes standard face key-point information; a second deforming module 50424, configured to perform deformation on the face region image according to the face key-point information in the face region image and the standard face template; and a second processing module 50426, configured to process the image corresponding to the first region and/or the image corresponding to the second region according to the face attribute information, the original face region image, and the deformed face region image.

According to one or more embodiments of the present disclosure, the first template obtaining module 50421 is configured to determine a standard face template required for current image processing from at least two different standard face templates included in a preset standard face template set; and/or the second template obtaining module 50422 is configured to determine a standard face template required for current image processing from at least two different standard face templates included in a preset standard face template set.

According to one or more embodiments of the present disclosure, when the processing performed on the image corresponding to the first region and/or the image corresponding to the second region in the face region image includes at least one of facial whitening, facial ruddy, or facial skin grinding, the processing module 504 processes the image corresponding to the first region and/or the image corresponding to the second region in the face region image in terms of the following: performing at least one of facial whitening, facial ruddy, or facial skin grinding on the image corresponding to the first region and/or the image corresponding to the second region in the face region image; and performing smooth processing on the processed face region image.

According to one or more embodiments of the present disclosure, the obtaining module 502 includes: a detecting module 5022, configured to perform face detection on the image to be processed by means of a pre-trained neural network; and an information obtaining module 5024, configured to obtain at least one face region image included in the image to be processed and face attribute information in the at least one face region image according to a detection result of the detecting module 5022.

According to one or more embodiments of the present disclosure, the face image processing apparatus of the embodiments further includes: a training module 506, configured to train the neural network.

The training module 506 includes: a scrambling module 5062, configured to perform at least information preserving scrambling processing on an original sample image including face key-point annotation information, to obtain a scrambled sample image and image information processed by the information preserving scrambling processing; an information obtaining module 5064, configured to detect the original sample image and the scrambled sample image based on the neural network, to obtain first prediction information for a face key-point in the original sample image and second prediction information for a face key-point in the scrambled sample image; a difference determining module 5066, configured to determine a first difference between the first prediction information and the annotation information, a second difference between the first prediction information and the second prediction information, and a third difference between the second difference and the image information processed by the information preserving scrambling processing; and an adjusting module 5068, configured to adjust network parameters of the neural network according to the first difference and the third difference.

According to one or more embodiments of the present disclosure, the scrambling module 5062 is configured to perform information preserving scrambling processing and information non-preserving scrambling processing on the original sample image including the face key-point annotation information, to obtain the scrambled sample image and the image information processed by the information preserving scrambling processing.

According to one or more embodiments of the present disclosure, the difference determining module 5066 includes: a first difference determining module 50662, configured to determine the first difference between the first prediction information and the face key-point annotation information in the original sample image using a first loss function, where the first loss function is used for measuring the accuracy of a face key-point prediction result in the original sample image.

According to one or more embodiments of the present disclosure, the difference determining module 5066 includes: a second difference determining module 50664, configured to determine the second difference between the first prediction information and the second prediction information using a second loss function, where the second loss function is used for measuring a difference between the face key-point prediction result in the original sample image and the face key-point prediction result in the scrambled sample image.

According to one or more embodiments of the present disclosure, the second difference determining module 50664 is further configured to obtain a distance between the first prediction information and the second prediction information by means of a first distance calculation function, the distance being the second difference.

According to one or more embodiments of the present disclosure, the difference determining module 5066 includes: a third difference determining module 50666, configured to obtain a distance between the second difference and the image information processed by the information preserving scrambling processing by means of a second distance calculation function, the distance being the third difference.

According to one or more embodiments of the present disclosure, the information preserving scrambling processing includes at least one of the following: affine transformation processing, translation processing, scaling processing, or rotation processing.

The face image processing apparatus of the embodiments is configured to realize the corresponding face image processing method in the foregoing multiple method embodiments, and has the beneficial effect of the corresponding method embodiments. Details are not described herein again.

Figure 8:
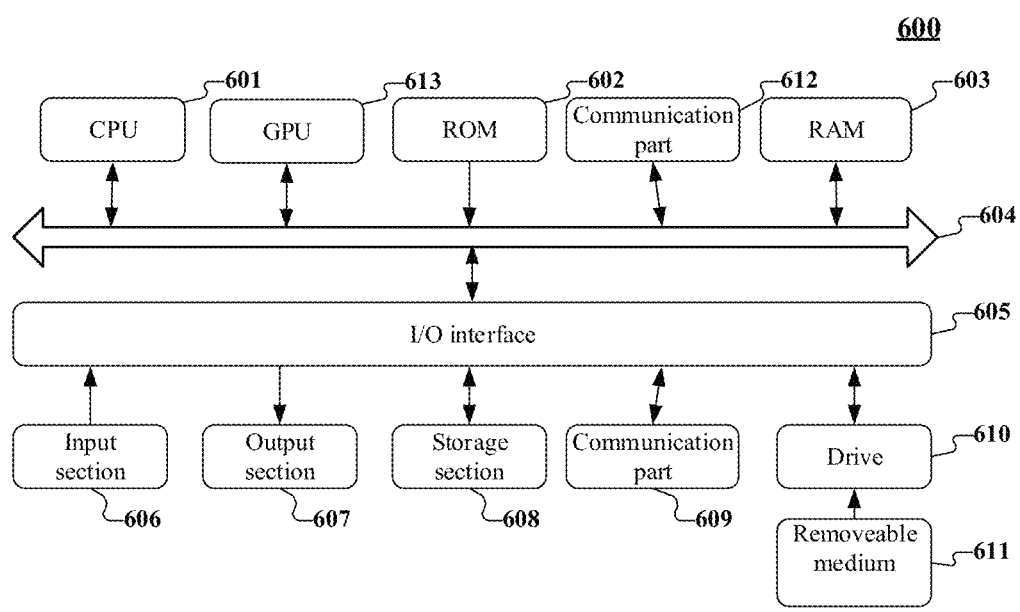
FIG. 8 is a schematic structural diagram of an electronic device according to embodiments of the present disclosure.

The embodiments of the present disclosure provide an electronic device which, for example, may be a mobile terminal, a PC, a tablet computer, a server, and the like. Referring to FIG. 8 below, illustrated is a schematic structural diagram of an electronic device 600, which may be a terminal device or a server, suitable for implementing the embodiments of the present disclosure. As shown in FIG. 8, the electronic device 600 includes one or more processors, a communication element, and the like. The one or more processors are, for example, one or more Central Processing Units (CPUs) 601 and/or one or more Graphic Processing Units (GPUs) 613, and the processor may execute appropriate actions and processing according to executable instructions stored in a Read Only Memory (ROM) 602 or executable instructions loaded from a storage section 608 to a Random Access Memory (RAM) 603. The communication element includes a communication component 612 and/or a communication interface 609. The communication component 612 may include, but is not limited to, a network card. The network card may include, but is not limited to, an InfiniBand (IB) network card. The communication interface 609 includes a communication interface of a network interface card such as an LAN card and a modem, and the communication interface 609 performs communication processing via a network such as the Internet. The processor may be in communication with the ROM 602 and/or the RAM 603 to execute the executable instruction, is connected to the communication component 612 by means of the communication bus 604, and is in communication with other target devices by means of the communication component 612, so as to complete operations corresponding to any face image processing method provided by the embodiments of the present disclosure. For example, face detection is performed on the image to be processed, and at least one face region image included in the image to be processed and face attribute information in the at least one face region image are obtained; and for the at least one face region image, an image corresponding to a first region and/or an image corresponding to a second region in the face region image is processed at least according to the face attribute information in the face region image, where the first region is a skin region, and the second region includes at least a non-skin region.

In addition, the RAM 603 may further store various programs and data required for operations of an apparatus. The CPU 601 or GPU 613, the ROM 602, and the RAM 603 are connected to each other by means of the communication bus 604. In the presence of the RAM 603, the ROM 602 is an optional module. The RAM 603 stores executable instructions, or writes the executable instructions to the ROM 602 during running, where the executable instructions enable the processor to perform corresponding operations of the foregoing communication method. An Input/output (I/O) interface 605 is also connected to the communication bus 604. The communication component 612 may be integrated, or may be configured to have a plurality of sub-modules (for example, a plurality of IB network cards) linked on the communication bus. The following components are connected to the I/O interface 605: an input section 606 including a keyboard, a mouse and the like; an output section 607 including a Cathode-Ray Tube (CRT), a Liquid Crystal Display (LCD), a loudspeaker and the like; a storage section 608 including hardware and the like; and the communication interface 609 of a network interface card including an LAN card, a modem and the like. A drive 610 is also connected to the I/O interface 605 according to requirements. A removable medium 611 such as a magnetic disk, an optical disk, a magneto-optical disk, a semiconductor memory or the like is mounted on the drive 610 according to requirements, so that a computer program read from the removable medium is installed on the storage section 608 according to requirements.

It should be noted that the architecture illustrated in FIG. 8 is merely an optional implementation. During specific practice, the number and types of the components in FIG. 8 may be selected, decreased, increased, or replaced according to actual requirements. Different functional components may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product, which includes a computer program tangibly contained in a machine-readable medium. The computer program includes a program code for executing a method illustrated in the flowchart. The program code may include corresponding instructions for correspondingly executing the operations of the methods provided by the embodiments of the present disclosure. For example, face detection is performed on the image to be processed, and at least one face region image included in the image to be processed and face attribute information in the at least one face region image are obtained; and for the at least one face region image, an image corresponding to a first region and/or an image corresponding to a second region in the face region image is processed at least according to the face attribute information in the face region image, where the first region is a skin region, and the second region includes at least a non-skin region. In such embodiments, the computer program may be downloaded from a network by means of the communication element and installed, and/or be installed from the removable medium 611. When the computer program is executed by the processor, functions provided in the method according to the embodiments of the present disclosure are executed.

It should be noted that according to needs for implementation, the components/operations described in the present disclosure are separated into more components/operations, and two or more components/operations or some operations of the components/operations are also combined into new components/operations. The foregoing method according to the embodiments of the present disclosure may be implemented in hardware or firmware, or may be implemented as software or a computer code that can be stored in a recording medium (such as a CD ROM, a RAM, a floppy disk, a hard disk or a magneto-optical disk), or may be implemented as a computer code that is downloaded by means of a network, is originally stored in a remote recording medium or a non-transitory machine-readable medium, and will be stored in a local recording medium. Therefore, the method described herein may be processed by using software that is stored in a recording medium that uses a general-purpose computer, a special-purpose processor, or programmable or dedicated hardware (such as an ASIC or an FPGA). It should be understood that a computer, a processor, a microprocessor controller or programmable hardware includes a storage component (for example, a RAM, a ROM, or a flash memory, etc.) that can store or receive software or a computer code. When the software or the computer code is accessed and executed by the computer, the processor or the hardware, the processing method described herein is implemented. In addition, when the general-purpose computer accesses a code that is used for implementing processing shown herein, execution of the code converts the general-purpose computer to a special-purpose computer configured to execute the processing shown herein.

A person of ordinary skill in the art may be aware that, in combination with the examples described in the embodiments disclosed in the present disclosure, units and method operations may be implemented by electronic hardware or a combination of computer software and electronic hardware. Whether these functions are performed by hardware or software depends on the particular applications and design constraint conditions of the technical solutions. A person skilled in the art may use different methods to implement the described functions for each particular application, but it should not be considered that such implementation goes beyond the scope of the embodiments of the present disclosure.

The implementations above are merely intended to describe the embodiments of the present disclosure instead of limiting the embodiments of the present disclosure. A person of ordinary skill in the art may make modifications and variations without departing from the spirit and scope of the embodiments of the present disclosure. Therefore, all equivalent technical solutions shall also fall within the scope of the embodiments of the present disclosure, and the patent protection scope of the embodiments of the present disclosure shall be subject to the claims.

The invention claimed is:

1. A face image processing method, comprising:
performing face detection on an image to be processed, and obtaining at least one face region image comprised in the image to be processed and face attribute information in the at least one face region image; and
for the at least one face region image, processing, at least according to the face attribute information in the face region image, at least one of an image corresponding to a first region in the face region image or an image corresponding to a second region in the face region image, wherein the first region is a skin region, and the second region comprises at least a non-skin region,
wherein the performing face detection on an image to be processed comprises: performing face detection on the image to be processed by means of a pre-trained neural network;
wherein training the neural network comprises:
obtaining, by performing at least information preserving scrambling processing on an original sample image comprising face key-point annotation information, a scrambled sample image and image information processed by the information preserving scrambling processing;
detecting the original sample image and the scrambled sample image based on the neural network;
obtaining first prediction information for a face key-point in the original sample image and second prediction information for a face key-point in the scrambled sample image;
determining a first difference between the first prediction information and the annotation information, a second difference between the first prediction information and the second prediction information, and a third difference between the second difference and the image information processed by the information preserving scrambling processing; and
adjusting, according to the first difference and the third difference, network parameters of the neural network.

2. The method according to claim 1, wherein before the processing, according to the face attribute information in the face region image, at least one of an image corresponding to a first region in the face region image or an image corresponding to a second region in the face region image at least, the method further comprises:
determining, according to user input information, at least one of the image corresponding to the first region in the face region image or the image corresponding to the second region in the face region image.

3. The method according to claim 1,
wherein the processing at least one of an image corresponding to a first region in the face region image or an image corresponding to a second region in the face region image comprises at least one of facial whitening, facial ruddy, face-lifting, eye enlargement, eye enhancement, eye size correction, facial skin grinding, tooth whitening, or facial enhancement;
wherein the face attribute information comprises at least one of the following:
gender information, race information, age information, facial movement information, facial attachment information, or facial angle information;
wherein the method further comprises at least one of the following:
the facial movement information comprises at least one of the following: eye close information or mouth open information;
the facial attachment information comprises at least one of the following: information on whether a beard is present, information on whether a mask is worn, or information on whether glasses are worn; or,
the facial angle information comprises at least one of the following: facial horizontal angle information, facial rotation angle information, or facial pitch angle information.

4. The method according to claim 1, wherein the processing, at least according to the face attribute information in the face region image, at least one of an image corresponding to a first region in the face region image or an image corresponding to a second region in the face region image comprises:
determining a facial processing parameter corresponding to the face attribute information in the face region image; and
processing, at least according to the facial processing parameter, at least one of the image corresponding to the first region in the face region image or the image corresponding to the second region in the face region image.

5. The method according to claim 4, wherein the determining a facial processing parameter corresponding to the face attribute information in the face region image comprises at least one of the following:
responsive to the face attribute information comprising the gender information, determining a facial processing parameter corresponding to the gender information, wherein a beauty processing intensity in facial processing parameters corresponding to male is lower than a beauty processing intensity in facial processing parameters corresponding to female;
responsive to the face attribute information comprising the race information, determining a facial processing parameter of a tone corresponding to a skin color race of the face region image indicated by the race information in the face attribute information, wherein different skin color races correspond to facial processing parameters of different tones;

responsive to the face attribute information comprising the facial movement information, determining a processing parameter of a facial specific part corresponding to the facial movement information;

responsive to the face attribute information comprising the face attachment information, determining the face processing parameter according to the face attachment information, wherein the determined facial processing parameter fails to comprise a processing parameter of the facial specific part occluded by the facial attachment in the facial region image; or responsive to the face attribute information comprising the facial angle information, determining a facial processing parameter corresponding to a face angle of the face region image indicated by the facial angle information, wherein different face angles correspond to different facial processing parameters.

6. The method according to claim 5, wherein the beauty processing intensity comprises at least one of the following: whitening intensity, ruddy intensity, skin grinding intensity, or face-lift proportion.

7. The method according to claim 5, wherein the determining a processing parameter of a facial specific part corresponding to the facial movement information comprises: responsive to the facial movement information comprising mouth open information, determining a whitening processing parameter of teeth.

8. The method according to claim 5, wherein responsive to the facial attachment information indicating the presence of worn glasses in the face region image, the processing parameter of the facial specific part occluded by the facial attachment comprises at least one of the following: an eye enlargement processing parameter, an eye enhancement processing parameter, or an eye size correction parameter.

9. The method according to claim 1, wherein the processing, according to the face attribute information and the face key-point information in the face region image, at least one of an image corresponding to a first region in the face region image or an image corresponding to a second region in the face region image comprises:

obtaining a preset standard face template, wherein the standard face template comprises standard face key-point information;

performing, according to the face key-point information in the face region image and the standard face key-point information, matching deformation on the standard face template; and processing, at least according to the face attribute information in the face region image and the deformed standard face template, at least one of the image corresponding to the first region or the image corresponding to the second region;

wherein the obtaining a preset standard face template comprises:

determining a standard face template required for current image processing from one standard face template or at least two different standard face templates comprised in a preset standard face template set.

10. The method according to claim 9, wherein the standard face template further comprises at least one of a first preset region for indicating a skin region in a standard face or a second preset region for indicating a non-skin region in the standard face;

the processing, at least according to the face attribute information in the face region image and the deformed standard face template, at least one of the image corresponding to the first region or the image corresponding to the second region comprises:

determining, at least according to at least one of the first preset region in the deformed standard face template or the second preset region in the deformed standard face template, at least one of the first region in the face region image or the second region in the face region image; and processing, according to the face attribute information in the face region image and at least one of the determined first region in the face region image or the determined second region in the face region image, at least one of the image corresponding to the first region or the image corresponding to the second region.

11. The method according to claim 10, wherein the determining, at least according to at least one of the first preset region in the deformed standard face template or the second preset region in the deformed standard face template, at least one of the first region in the face region image or the second region in the face region image comprises:

determining a region in the face region image corresponding to the first preset region in the deformed standard face template as a first initial region;

screening pixels for indicating non-skin in an image corresponding to the first initial region;

determining a region with the pixels for indicating non-skin screened in the first initial region as the first region; and determining a region in the face region image corresponding to the second preset region in the deformed standard face template and a portion screened from the first initial region as the second region.

12. The method according to claim 1, wherein the processing, according to the face attribute information and the face key-point information in the face region image, at least one of an image corresponding to a first region or an image corresponding to a second region in the face region image comprises:

obtaining a preset standard face template, wherein the standard face template comprises standard face key-point information;

performing, according to the face key-point information in the face region image and the standard face template, deformation on the face region image; and processing, according to the face attribute information, the original face region image, and the deformed face region image, at least one of the image corresponding to the first region or the image corresponding to the second region;

wherein the obtaining a preset standard face template comprises:

determining a standard face template required for current image processing from one standard face template or at least two different standard face templates comprised in a preset standard face template set.

13. The method according to claim 1, wherein the processing at least one of an image corresponding to a first region in the face region image or an image corresponding to a second region in the face region image comprises:

performing at least one of facial whitening, facial ruddy, or facial skin grinding on at least one of the image corresponding to the first region in the face region image or the image corresponding to the second region in the face region image; and performing smooth processing on the processed face region image.

14. The method according to claim 1, wherein the performing at least information preserving scrambling processing on an original sample image comprising face key-point annotation information comprises:
performing information preserving scrambling processing and information non-preserving scrambling processing on the original sample image comprising the face key-point annotation information, wherein the information preserving scrambling processing comprises at least one of the following: affine transformation processing, translation processing, scaling processing, or rotation processing.

15. The method according to claim 1, wherein the determining a first difference between the first prediction information and the annotation information comprises:
determining, by using a first loss function, the first difference between the first prediction information and the face key-point annotation information in the original sample image, wherein the first loss function is used for measuring the accuracy of a face key-point prediction result in the original sample image.

16. The method according to claim 15, wherein the determining a second difference between the first prediction information and the second prediction information comprises: determining, by using a second loss function, the second difference between the first prediction information and the second prediction information, wherein the second loss function is used for measuring a difference between the face key-point prediction result in the original sample image and the face key-point prediction result in the scrambled sample image.

17. An electronic device, comprising:
a processor; and
a memory for storing instructions executable by the processor;
wherein execution of the instructions by the processor causes the processor to perform:
performing face detection on an image to be processed, and obtaining at least one face region image comprised in the image to be processed and face attribute information in the at least one face region image; and
for the at least one face region image, processing, at least according to the face attribute information in the face region image, at least one of an image corresponding to a first region in the face region image or an image corresponding to a second region in the face region image, wherein the first region is a skin region, and the second region comprises at least a non-skin region,
wherein the performing face detection on an image to be processed comprises: performing face detection on the image to be processed by means of a pre-trained neural network;
wherein training the neural network comprises:
obtaining, by performing at least information preserving scrambling processing on an original sample image comprising face key-point annotation information, a scrambled sample image and image information processed by the information preserving scrambling processing;
detecting the original sample image and the scrambled sample image based on the neural network;
obtaining first prediction information for a face key-point in the original sample image and second prediction information for a face key-point in the scrambled sample image;
determining a first difference between the first prediction information and the annotation information, a second difference between the first prediction information and the second prediction information, and a third difference between the second difference and the image information processed by the information preserving scrambling processing; and
adjusting, according to the first difference and the third difference, network parameters of the neural network.

18. A non-transitory computer readable storage medium, configured to store computer-readable instructions, wherein execution of the instructions by the processor causes the processor to perform:
performing face detection on an image to be processed, and obtaining at least one face region image comprised in the image to be processed and face attribute information in the at least one face region image; and
for the at least one face region image, processing, at least according to the face attribute information in the face region image, at least one of an image corresponding to a first region in the face region image or an image corresponding to a second region in the face region image, wherein the first region is a skin region, and the second region comprises at least a non-skin region,
wherein the performing face detection on an image to be processed comprises: performing face detection on the image to be processed by means of a pre-trained neural network;
wherein training the neural network comprises:
obtaining, by performing at least information preserving scrambling processing on an original sample image comprising face key-point annotation information, a scrambled sample image and image information processed by the information preserving scrambling processing;
detecting the original sample image and the scrambled sample image based on the neural network;
obtaining first prediction information for a face key-point in the original sample image and second prediction information for a face key-point in the scrambled sample image;
determining a first difference between the first prediction information and the annotation information, a second difference between the first prediction information and the second prediction information, and a third difference between the second difference and the image information processed by the information preserving scrambling processing; and
adjusting, according to the first difference and the third difference, network parameters of the neural network.

19. The method according to claim 1, wherein
the method further comprises: obtaining face key-point information in the at least one face region image; and
said for the at least one face region image, processing, at least according to the face attribute information in the face region image, at least one of an image corresponding to a first region in the face region image or an image corresponding to a second region in the face region image comprises:
for the at least one face region image, processing, according to the face attribute information and the face key-point information in the face region image, at least one of the image corresponding to the first region in the face region image or the image corresponding to the second region in the face region image.

* * * * *